(12) United States Patent
Boyangu et al.

(10) Patent No.: US 11,947,613 B2
(45) Date of Patent: *Apr. 2, 2024

(54) SYSTEM AND METHOD FOR EFFICIENTLY QUERYING DATA USING TEMPORAL GRANULARITIES

(71) Applicant: Sisense Ltd., Ramat Gan (IL)

(72) Inventors: Guy Boyangu, Tel Aviv (IL); Leon Gendler, Herzliya (IL)

(73) Assignee: SISENSE LTD., Ramat Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,502

(22) Filed: Apr. 29, 2022

(65) Prior Publication Data

US 2022/0261452 A1 Aug. 18, 2022

Related U.S. Application Data

(63) Continuation of application No. 16/707,324, filed on Dec. 9, 2019, now Pat. No. 11,354,373.

(60) Provisional application No. 62/779,871, filed on Dec. 14, 2018.

(51) Int. Cl.
*G06F 16/9537* (2019.01)
*G06F 16/14* (2019.01)
*G06F 16/16* (2019.01)

(52) U.S. Cl.
CPC ........ *G06F 16/9537* (2019.01); *G06F 16/144* (2019.01); *G06F 16/156* (2019.01); *G06F 16/168* (2019.01)

(58) Field of Classification Search
CPC .... G06F 16/144; G06F 16/156; G06F 16/168; G06F 16/9537
See application file for complete search history.

(56) References Cited

U.S. PATENT DOCUMENTS

| | | | |
|---|---|---|---|
| 9,256,667 B2 | 2/2016 | Koudas et al. | |
| 2002/0095399 A1* | 7/2002 | Devine | G06F 16/958 |
| 2008/0059415 A1 | 3/2008 | Bakalash et al. | |
| 2009/0240746 A1* | 9/2009 | Chirlian | G06Q 30/00 |
| 2012/0166421 A1 | 6/2012 | Cammert et al. | |
| 2012/0316697 A1 | 12/2012 | Boardman et al. | |
| 2013/0117272 A1 | 5/2013 | Barga et al. | |
| 2014/0258269 A1* | 9/2014 | Slifer | G06F 16/29 707/722 |
| 2015/0081725 A1 | 3/2015 | Ogawa et al. | |

(Continued)

FOREIGN PATENT DOCUMENTS

CN 106648446 A 5/2017

*Primary Examiner* — Angelica Ruiz
(74) *Attorney, Agent, or Firm* — M&B IP Analysts, LLC

(57) ABSTRACT

A system and method for displaying data using temporal granularities. The method includes determining at least one first dataset of a plurality of datasets based on at least one temporal data requirement, wherein the plurality of datasets is generated based on a data model, wherein each of the plurality of datasets is generated based further on a distinct temporal granularity of a plurality of temporal granularities, wherein the distinct temporal granularity of each of the at least one first dataset meets at least one of the at least one temporal data requirement; and querying the determined at least one first dataset in order to obtain at least one query result.

13 Claims, 7 Drawing Sheets

(56) References Cited

U.S. PATENT DOCUMENTS

| | | | |
|---|---|---|---|
| 2015/0088492 A1* | 3/2015 | Liu | G06F 16/9537 704/9 |
| 2019/0043004 A1* | 2/2019 | Lesieur | G02B 27/0176 |
| 2019/0324964 A1* | 10/2019 | Shiran | G06F 16/2228 |

* cited by examiner

SYSTEM AND METHOD FOR EFFICIENTLY QUERYING DATA USING TEMPORAL GRANULARITIES

CROSS-REFERENCE TO RELATED APPLICATIONS

This application is a continuation of U.S. Non-Provisional application Ser. No. 16/707,324 filed on Dec. 9, 2019, now allowed, which claims the benefit of U.S. Provisional Application No. 62/779,871 filed on Dec. 14, 2018, the contents of which are hereby incorporated by reference.

TECHNICAL FIELD

The present disclosure relates generally to improving efficiency of queries in large datasets, and more specifically to reducing processing and query response times using temporal granularities.

BACKGROUND

In modern society, data storage and analysis has become increasingly relevant to businesses. For example, business intelligence (BI) solutions attempt to glean insight from large collections of data, some of which are unorganized. As the amount of data stored by businesses has increased exponentially in recent years, the amount of time and computing resources required for querying these collections of data has increased significantly. From an end user's perspective, the additional time required for querying may result in notable delays and frustration.

Many tools are available today to generate reports with an aim at providing insights out of massive data stores and finding anomalies therein, which themselves cannot be inferred by human users alone. This is both due to data size and the continuously growing data sources. Even relatively simple websites with high traffic may continuously generate a wealth of information which is impossible for a human to track. Thus, improved querying may be particularly relevant in the business data reporting context.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for displaying data using temporal granularities. The method comprises: determining at least one first dataset of a plurality of datasets based on at least one temporal data requirement, wherein the plurality of datasets is generated based on a data model, wherein each of the plurality of datasets is generated based further on a distinct temporal granularity of a plurality of temporal granularities, wherein the distinct temporal granularity of each of the at least one first dataset meets at least one of the at least one temporal data requirement; and querying the determined at least one first dataset in order to obtain at least one query result.

Certain embodiments disclosed herein also include a non-transitory computer readable medium having stored thereon causing a processing circuitry to execute a process, the process comprising: determining at least one first dataset of a plurality of datasets based on at least one temporal data requirement, wherein the plurality of datasets is generated based on a data model, wherein each of the plurality of datasets is generated based further on a distinct temporal granularity of a plurality of temporal granularities, wherein the distinct temporal granularity of each of the at least one first dataset meets at least one of the at least one temporal data requirement; and querying the determined at least one first dataset in order to obtain at least one query result.

Certain embodiments disclosed herein also include a system for displaying data using temporal granularities. The system comprises: a processing circuitry; and a memory, the memory containing instructions that, when executed by the processing circuitry, configure the system to: determine at least one first dataset of a plurality of datasets based on at least one temporal data requirement, wherein the plurality of datasets is generated based on a data model, wherein each of the plurality of datasets is generated based further on a distinct temporal granularity of a plurality of temporal granularities, wherein the distinct temporal granularity of each of the at least one first dataset meets at least one of the at least one temporal data requirement; and query the determined at least one first dataset in order to obtain at least one query result.

Certain embodiments disclosed herein also include a method for providing datasets for efficient querying based on temporal granularities, comprising: generating a plurality of datasets based on a data model, wherein each of the plurality of datasets is generated based further on a distinct temporal granularity of a plurality of temporal granularities, wherein a structure of each dataset of the plurality of datasets is consistent with a structure of each other dataset of the plurality of datasets, wherein each of the plurality of datasets represents a distinct period of time such that at least two datasets of the plurality of datasets require different amounts of time to obtain query results from each other.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
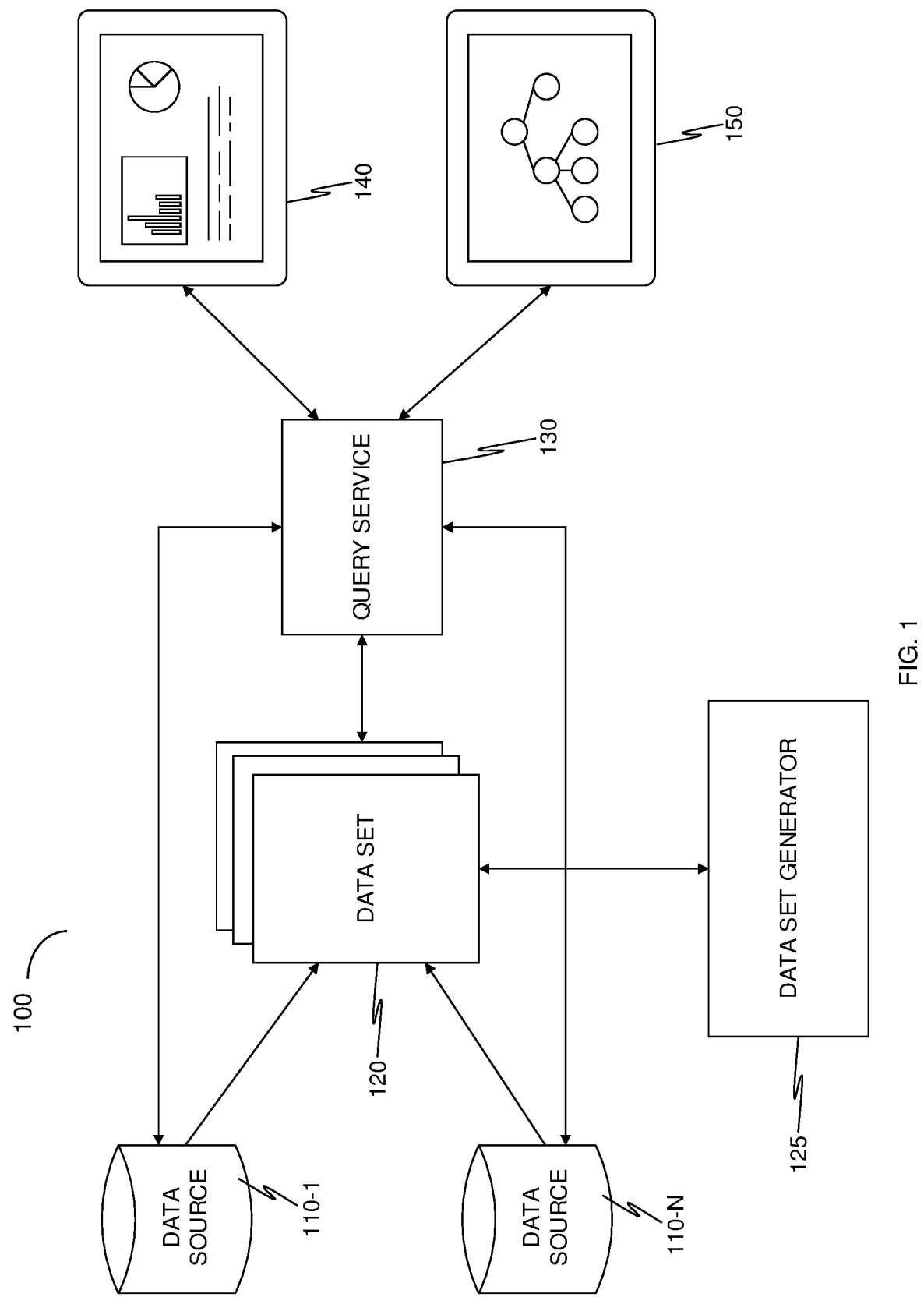
FIG. 1 is a data flow diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Data stored may have different implications in meaning depending on context. One example of such context is temporal. For example, generation of $10 per day is significantly different from generating $10 per minute.

It has been identified that the specific granularity of data required may vary temporally, i.e., based on periods of time in which data is collected, for a variety of reasons. First, an aggregate relating to this week's data may be skewed if aggregated with last week's data as well. Second, over a long enough period of time, especially with aggregate based performance indicators, it is difficult to recognize anomalies (for example, if data 'averages out'). Third, within a temporal context, it is sometimes easier to explain data. For example, when tracking the number of Valentine's Day cards being sold, doing a monthly average for the month of February would yield meaningless data. However, daily or even hourly temporal resolution may lead to insights in the sales cycle of such cards, allowing sellers to be better prepared for demand.

Increasing the temporal resolution of query results (for example, providing query results from a dataset representing a month's worth of data rather than a day's worth of data) comes at a cost. Specifically, the larger time frame being represented by query results, the more data that is processed. This increased processing also takes longer to resolve queries. For example, if a call center wants to compute average call times over the last 24 hours, such a query would require less computational resources than a query requesting all data over the month. The disclosed embodiments therefore provide techniques for improving query efficiency by providing datasets defined using distinct temporal granularities and determining which datasets to query based on temporal data requirements.

A user requesting data often only needs a specific granularity (e.g., daily sales rather than monthly or annual) and, therefore, it has been identified that query times and use of computing resources may be reduced by providing smaller datasets that provide different temporal granularities.

It has further been identified that, even when a user requires a full or otherwise larger dataset, the user cannot comprehend the full dataset at once. Thus, presenting the user with query results from querying limited portions of the larger dataset in stages would allow a user to begin viewing query results sooner due to the faster querying of smaller the datasets.

The various disclosed embodiments include a method and system for querying data using temporal granularities. Multiple datasets are generated based on a data model. The data model includes a data structure and represents a full or larger set of data than the generated datasets. Each of the generated datasets is generated based on a distinct temporal granularity such that its size is different from the size of the other generated datasets. As a result, different datasets can be queried depending on a required temporal granularity in order to reduce querying time and processing as compared to querying the entire data model.

Based on one or more temporal data requirements and the temporal granularity of each of the datasets, one of the datasets to be queried is determined. The temporal data requirements may be determined based on, for example, a request for data indicating a desired temporal granularity. The determined dataset is queried in order to obtain query results. The query results may be, for example, sent for display on a user device.

In some embodiments, more than one dataset may be determined to be queried. The determined datasets may be queried in parallel such that query results of one dataset are obtained while the other datasets are being queried. The query results may be sent to a user device in stages, with each stage including sending query results of querying one of the determined datasets. In this manner, a user may be provided some query results faster and then ultimately provided the entirety of the query results while viewing a portion of the query results.

The disclosed embodiments provide techniques that increase efficiency of querying large datasets by, for example, reducing time and use of processing resources required to obtain query results. Additionally, the disclosed embodiments provide techniques for improving user interfaces used for displaying query results by sequentially showing portions of a larger dataset in increasing temporal resolution, thereby increasing user engagement.

FIG. 1 is a data flow diagram 100 utilized to describe various disclosed embodiments.

In the data flow diagram 100, data sources 110-1 through 110-N (where N is an integer having a value of 2 or greater) (hereinafter referred to individually as a data source 110 or collectively as data sources 110), a query service 130, and a dataset generator 125 interact with datasets 120. More specifically, the dataset generator 125 is configured to generate the datasets 120 based on temporal granularities as described herein using data stored in the data sources 110.

Each of the data sources 110 may be, but is not limited to, a data lake, a data warehouse, a database, a database table, a combination thereof, and the like. Each of the datasets 120 is the result of extracting, transforming, and loading (not necessarily in that order) data from the data sources 110.

The query service 130 is a network-based service to which user-owned requesting devices such as a user device 140, a client device 150, or both, send request for data. The requests may include, or may be realized as, queries. The query service 130 may be implemented, for example, via a server configured to send queries to the data sources 110 for execution in order to obtain query results to return to the requesting device. The query service 130 may check whether a user of a requesting device has permission to execute queries on the required data source(s) 110, the required data set(s) 120. The query service 130 may further manage load balancing of queries, prioritize execution of queries, deduplicate query execution, a combination thereof, and the like.

Each of the user device 140 and the client device 150 may be, but is not limited to, a personal computing device such as a personal computer, laptop computer, smartphone, tablet computer, and the like. The user device 140 may be configured to, for example, accept inputs from a user related to data to be requested and to send requests for data to the query service 130. The user device 140 may be further configured to receive data from the query service 130 and to display such data to the user of the user device 140. The displayed data may include, but is not limited to, query results, reports generated based on query results, and the like.

The client device 150 may be configured to generate a data model (not shown) based on which the datasets 120 may be generated. To this end, the client device 150 may request data from one or more of the data sources 110 via the query service 130. The data requested by the client device 150 is used to generate the data model. A data node may be initiated (for example as described herein below with respect to FIG. 2) which stores a data structure, such as a table, into which data extracted from the data sources 110 is loaded. This data structure with data loaded therein is a data model that may be referred to as a semantic model. The client device 150 may further configure access permissions for user accounts, which in turn can be associated with user devices such as the user device 140.

The data set generator 125 is configured to generate multiple datasets based on the semantic model as described herein. Specifically, multiple datasets having distinct temporal granularities are generated. Because the datasets are generated based on the same underlying model, their structure is consistent. However, the actual data contained therein may differ because each dataset represents data from a distinct period of time. These periods of time may be overlapping. As a non-limiting example, different temporal granularity datasets may represent data related to the past hour, the past 24 hours, the past week, the past month, the past quarter, the past year, and the like. Datasets related to different time periods having the same temporal granularity may also be generated. As a non-limiting example, a dataset may be generated for each hour in a 24-hour period.

Figure 2:
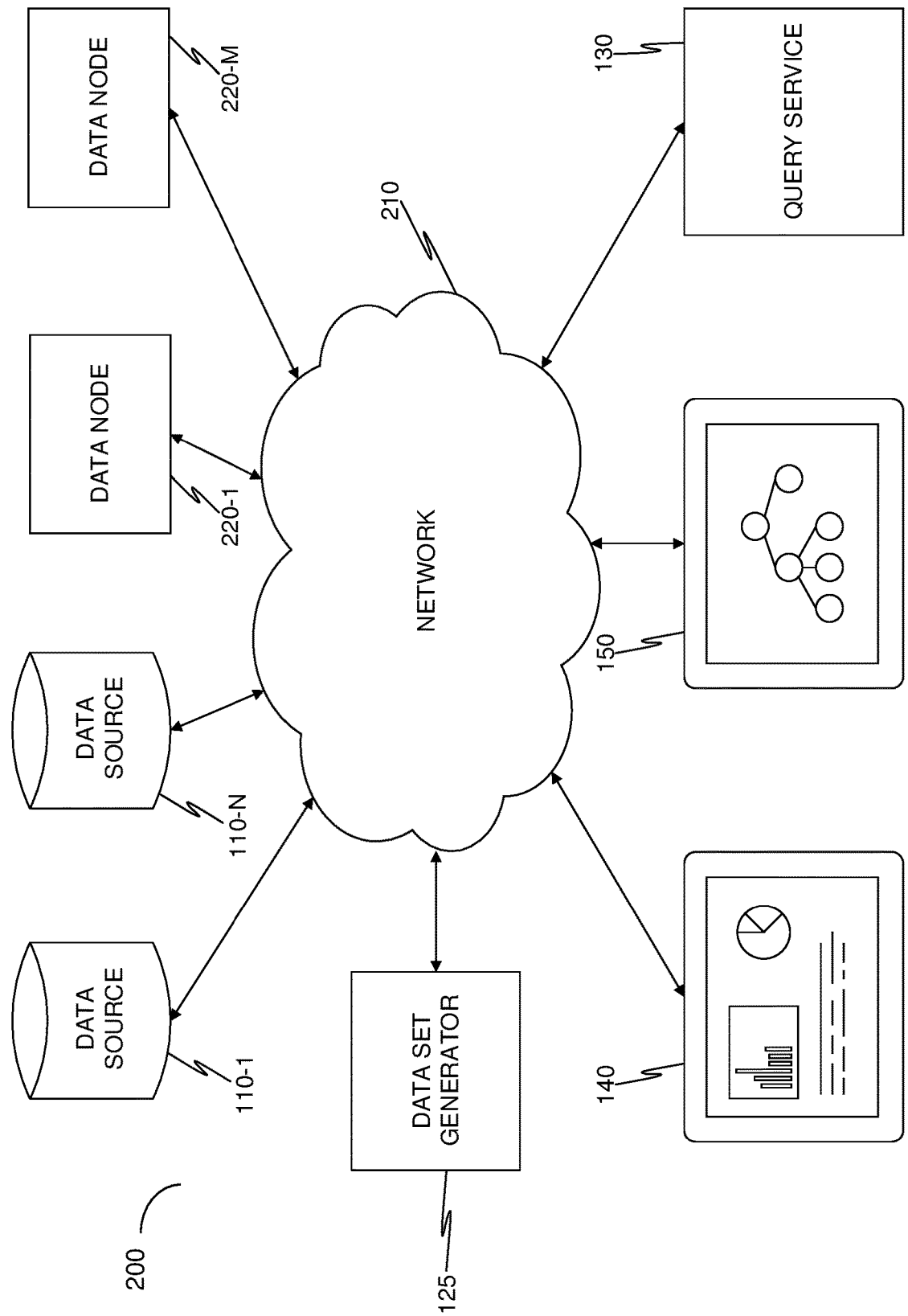
FIG. 2 is a network diagram 200 of a cloud-based computing environment utilized to describe various disclosed embodiments.

FIG. 2 is a network diagram 200 of a cloud-based computing environment utilized to describe various disclosed embodiments. The cloud-based computing environment 200 includes the data sources 120, the data set generator 125, the query service 130, the user device 140, the client device 150, and data nodes 220-1 through 220-M (where M is an integer having a value greater than or equal to 2) (hereinafter referred to individually as a data node 220 and collectively as data nodes 220) communicating via a network 210. The network 210 may be, but is not limited to, a wireless, cellular or wired network, a local area network (LAN), a wide area network (WAN), a metro area network (MAN), the Internet, the worldwide web (WWW), similar networks, and any combination thereof.

Each data node 220 is a machine in, for example but not limited to, a cloud-based computing environment. Each data node 220 stores one or more data sets (e.g., the data sets 120, FIG. 1). The data nodes 220 may be queried (for example, by the query service 130) in order to obtain query results from their respective data sets.

It should be noted that the embodiments disclosed herein are not limited to the particular configurations shown in FIG. 2. Different configurations, including but not limited to combining the functionality of the query service 130 and the data generator 125 into the same system, may be equally utilized without departing from the scope of the disclosure.

Figure 3:
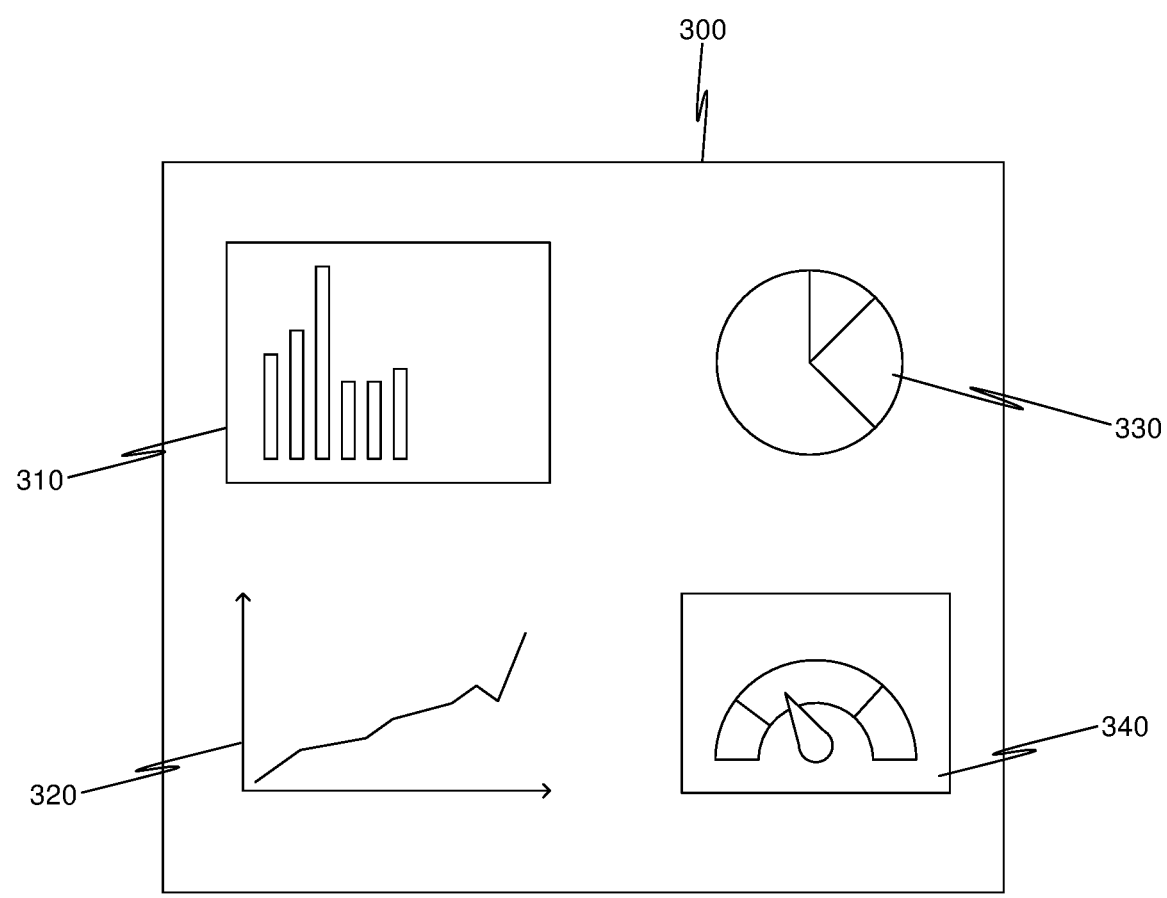
FIG. 3 is an illustration of a graphical user interface showing an example data report.

FIG. 3 is an illustration of a graphical user interface 300 showing an example data report. The data report is generated based at least partially on query results (e.g., results of querying the datasets 120 or the data sources 110), and may include, but is not limited to, data in the query results (e.g., in the form of a table), information derived based on query results (e.g., statistics or other summary information), performance indicators, and the like.

The graphical user interface 300 may include widgets such as, but not limited to, a bar graph 310, a plot 320, a pie chart 330, and a gauge chart 340. Each widget is a display element of the graphical user interface 300 which may change based on results from querying different datasets or data sources. As a non-limiting example, the needle of the gauge chart 340 may move according to query results.

Figure 4:
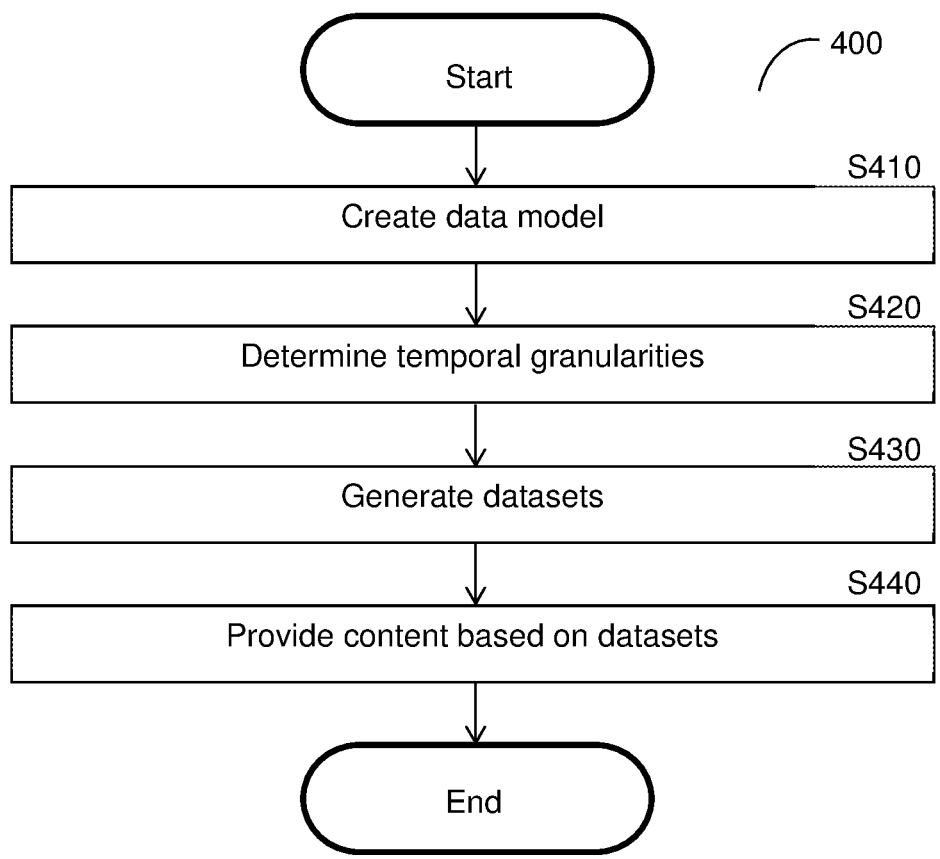
FIG. 4 is a flowchart illustrating a method for providing a temporal granularity to displayed data according to an embodiment.

FIG. 4 is a flowchart 400 illustrating a method for efficiently querying data using temporal granularities according to an embodiment. In an embodiment, the method may be performed by the dataset generator 125, FIG. 1. Some steps of the method may be performed by other components shown in FIG. 1 such as, but not limited to, the query service 130.

At S410, a data model is created. In an embodiment, creating the data model includes extracting data from one or more data sources (e.g., the data sources 110, FIG. 1) and loading the extracted data into a data structure (e.g., a data structure stored in one of the data nodes 220, FIG. 2).

At S420, multiple distinct temporal granularities to be used for generating datasets having distinct temporal granularities are determined. The temporal granularities may be divided into standard time units such as, but not limited to, seconds, minutes, hours, days, weeks, months, and the like. The temporal granularities may further include one or more time frames, for example the granularity may be hourly, and the time frame may be 24 hours. In some implementations, the temporal granularity may be of non-standard time units.

The determined temporal granularities include distinct temporal granularities such that the time units of at least some of the temporal granularities are different. To this end, the determined temporal granularities include temporal granularities defined with respect to at least two units of time. Due to the different units of time, at least some sizes of the respective datasets created based on the determined temporal granularities differ. Thus, smaller datasets (which are faster and require less processing power to query) may be queried depending on the temporal data requirements. As a non-limiting example, hours and days may be different temporal granularities such that datasets generated based on hourly data are, on average, smaller than datasets generated based on daily data.

In an embodiment, the temporal granularities may be determined based on user selections, for example, based on inputs received from the client device 150. Alternatively or collectively, temporal granularities may be determined based on the content of the data model. For example, one or more threshold amounts of data may be utilized such that, if the amount of data included in datasets generated based on a temporal granularity is either above or below one of the thresholds, the temporal granularity is not used. The thresholds may be predetermined thresholds that are different for different temporal granularities. As a non-limiting example, daily sales may provide less insight than hourly sales, especially if most sales are happening at a time which is not expected to generate many sales (i.e. database events logging data in table). Thus, a threshold for daily sales may not be met such that a daily temporal granularity is not used, while a threshold for hourly sales is met such that an hourly temporal granularity is used.

At S430, one or more datasets is generated for each of the determined temporal granularities. Because the datasets include datasets generated based on temporal granularities having different time units, the datasets include data representing different periods of time. As a non-limiting example, data returned from querying the datasets may yield a total number of sales for the past 24 hours, for each day of the month, and a total count for the month.

In an embodiment, at least some of the datasets may be generated via aggregation of smaller temporal granularity datasets. The smaller temporal granularity datasets may be queried faster than the larger temporal granularity datasets. As a non-limiting example, datasets having a first hourly temporal granularity may be generated hourly, and datasets having a second daily temporal granularity may be generated periodically by aggregating 24 of the hourly datasets. Queries which are day-specific (i.e., related to trends throughout a day) may be sent to the appropriate dataset having the first hourly temporal granularity, while queries which are month-specific (i.e., related to trends over the course of a month) may be sent to the appropriate dataset having the second daily temporal granularity.

In a further embodiment, the datasets may be generated based on weighted data points. To this end, weights may be included for various data points in the data model used to generate the datasets. This would allow for retaining past data when dealing, for example, with averages. As a non-limiting example, a user may generate a query to determine a daily income average when data of a first week (e.g., the past week) includes data points for each day, and data of a second week (e.g., the week before the past week) is already aggregated to a single data point which represents the daily income average for the second week. In order to generate a result, a weight should be assigned to the data point of the second week in order to represent that the second week data point includes past values which have already been aggregated. In this case the weight would be '7'.

At S440, content is provided based on the datasets. In an embodiment, the content may be provided, for example, as described below with respect to FIG. 5. More specifically, one or more target datasets of the generated datasets are determined based on temporal data requirements, and the target datasets are queried. Query results from querying the target datasets are used to create the content to be provided.

In an embodiment, the content may be provided sequentially with respect to the different time units of temporal granularities of the queried datasets. As a non-limiting example, content may first be provided based on query results from an hourly dataset, and content based on query results from a monthly dataset may be provided thereafter. As another non-limiting example, first content may be provided based on query results from an hourly dataset, second content may be provided based on query results from a monthly dataset, and third content may be provided based on query results from an entire database. Each subsequent stage of content in the sequence may replace the previous stage, for example, by replacing a display of a previous stage of content with a display of subsequent content. Providing content sequentially with respect to temporal granularities allows for eventually showing users higher resolution of data (i.e., a more complete picture of an entire database) while minimizing downtime in which the user awaits a display of data (for example, time spent viewing an hourglass or other icon indicating that data is being processed). This increases user engagement with a user interface illustrating the various stages of content.

Figure 5:
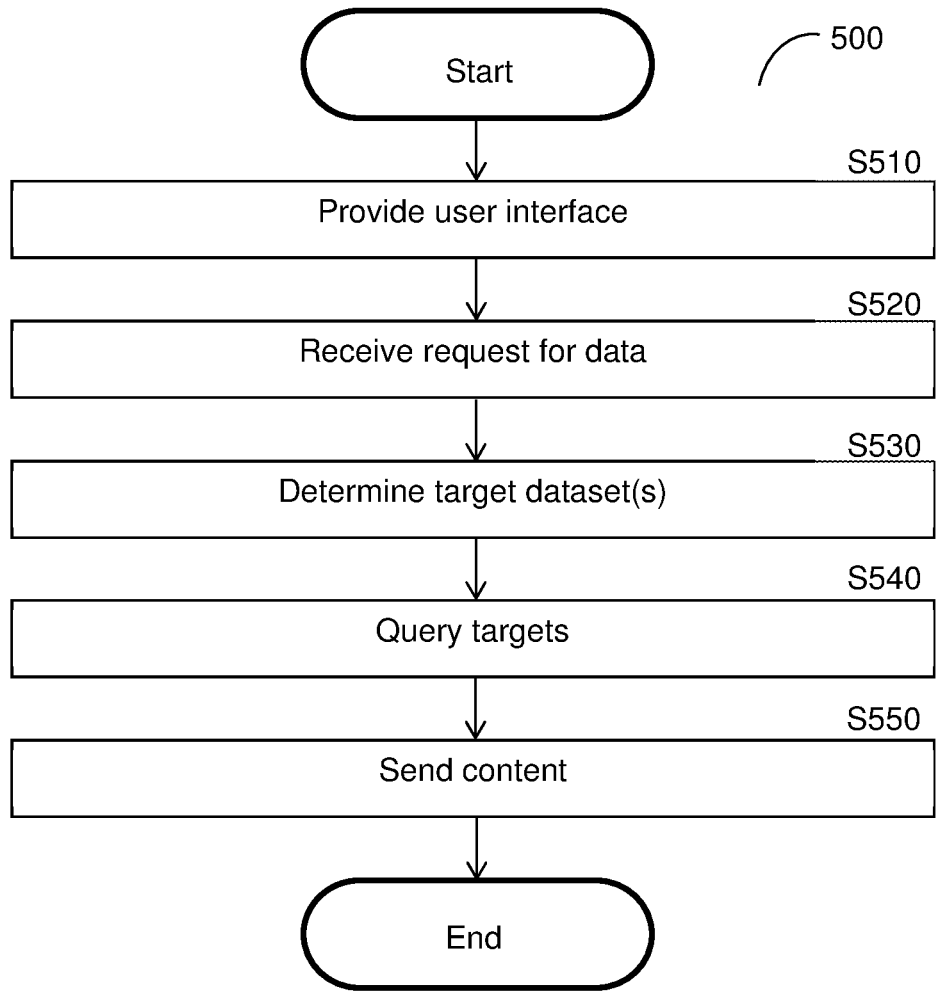
FIG. 5 is a flowchart illustrating a method for providing content including a temporal granularity according to an embodiment.

FIG. 5 is a flowchart 500 illustrating a method for providing content based on temporal granularity data according to an embodiment. In an embodiment, the method may be performed by the query service 130, FIG. 1.

At optional S510, a user interface is provided. The user interface includes a graphic element which is rendered for display on a device. The user interface may be interactive, receiving input from the user through I/O interfaces of the client device and changing the rendered display accordingly.

At S520, a request for data is received. The request may include an indication of desired temporal resolutions, which may be defined with respect to a particular temporal granularity.

At S530, one or more target datasets to be queried is determined. In an embodiment, the target datasets may be determined based on the desired temporal resolutions. In another embodiment, the target datasets may be determined based on one or more thresholds related to amounts of data as described above. In some embodiments, S530 may include determining a target database to be queried in addition to the target datasets.

At S540, the determined targets are queried in order to obtain query results related to one or more temporal granularities.

At S550, content generated based on the obtained query results is sent for display. The content may include the query results, graphical user interface content, reports, combinations thereof, and the like.

Figure 6:
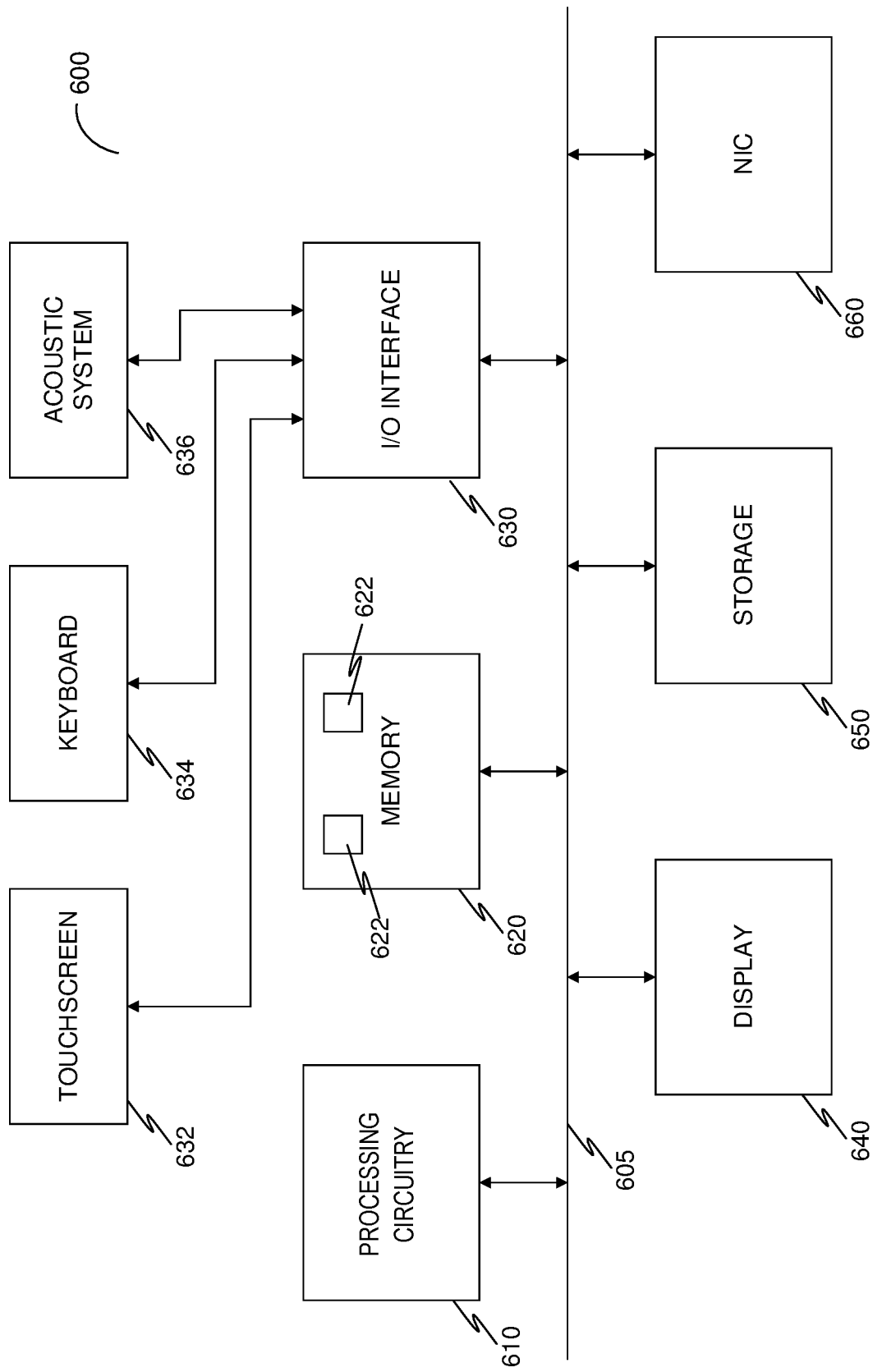
FIG. 6 is a schematic diagram of a requesting device.

FIG. 6 is an example schematic illustration of a requesting device 600. The requesting device 600 is configured to send requests for data to a query service and may be, for example, the user device 140 or the client device 150. The requesting device 600 includes a processing circuitry 610, a memory 620, an input/output (I/O) interface 630, a display 640, a storage 650, and a network interface controller 660.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The processing circuitry 610 is coupled, for example via a bus 605, to the memory 620. The memory 420 may be volatile (e.g., RAM, etc.), non-volatile (e.g., ROM, flash memory, etc.), or a combination thereof.

The memory 620 may include a memory portion 622 that contains instructions that, when executed by the processing circuitry 610, configures the requesting device to send requests, display data, and the like, as describe herein. The memory 620 may be further used as a working scratch pad for the processing element 610, a temporary storage, and the like. The memory 620 may further include a memory portion 624 containing user account information, UI rendering instructions, and query results.

The I/O interface 630 may provide access to a touchscreen 632, a keyboard 634, an acoustic system 636, and the like. In some implementations, the display 640 may be coupled with the processing circuitry 610 via the I/O interface 630. The display 640 receives rendering instructions to display, for example, a graphical portion of the user interface for a user of the device 600 to view.

In one configuration, software for implementing one or more embodiments disclosed herein may be stored in the storage 650. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The NIC 660 provides various connectivity interfaces for the device 600 in order to allow, for example, connecting with the network 210 of FIG. 2.

Figure 7:
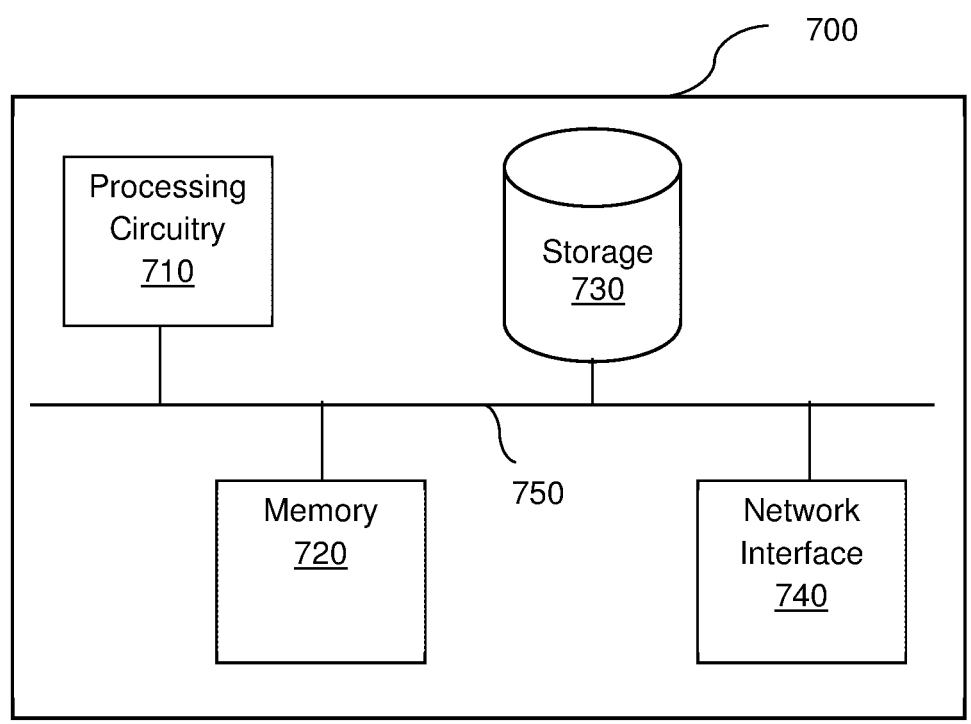
FIG. 7 is a schematic diagram of a system according to an embodiment.

FIG. 7 is an example schematic diagram of a system 700 according to an embodiment. The system 700 demonstrates various components (i.e., logical or physical components) which may be utilized to realize the disclosed embodiments. To this end, the query service 130, the dataset generator 125, or a combination thereof, may be realized consistent with the system 700.

The system 700 includes a processing circuitry 710 coupled to a memory 720, a storage 730, and a network interface 740. In an embodiment, the components of the system 700 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., RAM, etc.), non-volatile (e.g., ROM, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 710 to perform at least some of the various processes described herein.

The storage 730 may be magnetic storage, optical storage, and the like, and may be realized, for example, as flash memory or other memory technology, CD-ROM, Digital Versatile Disks (DVDs), or any other medium which can be used to store the desired information.

The network interface 740 may allow the system 700 to communicate for purposes such as, but not limited to, receiving requests from a requesting device, sending queries to the datasets 120, sending content to the requesting device, and the like. The network interface 740 may, alternatively or collectively, allow the system 700 to communicate for purposes such as, but not limited to, extracting data from the data sources 110, loading data into data nodes 220, and the like.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for querying a data source based on temporal granularity, comprising:
   determining a target dataset from among a plurality of preexisting datasets based on a request including a query for execution and a temporal granularity;
   querying the target dataset based on the request; and
   generating an output based on a query result received in response to querying the target dataset,
   wherein each of the plurality of preexisting datasets is based on at least one temporal data requirement,
   wherein the plurality of datasets is generated based on a data model, the data model including a data structure and representing a set of data larger in size than at least one of the plurality of datasets, wherein at least one dataset of the plurality of datasets has a size that is different from respective sizes of other datasets of the plurality of datasets.

2. The method of claim 1, wherein the target dataset is a first target dataset, further comprising:
   determining a plurality of target datasets including the first target dataset, wherein each target dataset is determined based on the request and a respective temporal data requirement.

3. The method of claim 2, further comprising:
   generating the output based on a plurality of query results, each query result corresponding to a target dataset of the plurality of target datasets.

4. The method of claim 2, further comprising:
   generating an aggregated dataset based on a subset of the plurality of target datasets; and
   querying the aggregated dataset based on the request.

5. The method of claim 4, wherein the aggregated dataset is generated further based on a weight assigned to each target dataset of the subset of the plurality of target datasets.

6. The method of claim 5, wherein the weight assigned to each target dataset is based on a temporal requirement of an associated target dataset.

7. A non-transitory computer readable medium having stored thereon instructions for causing a processing circuitry to execute a process, the process comprising:
   determining a target dataset from among a plurality of preexisting datasets based on a request including a query for execution and a temporal granularity;
   querying the target dataset based on the request; and
   generating an output based on a query result received in response to querying the target dataset, wherein each of the plurality of preexisting datasets is based on at least one temporal data requirement, wherein the plurality of datasets is generated based on a data model, the data model including a data structure and representing a set of data larger in size than at least one of the plurality of datasets, wherein at least one dataset of the plurality of datasets has a size that is different from respective sizes of other datasets.

8. A system for querying a data source based on temporal granularity, comprising:
   a processing circuitry; and
   a memory, the memory containing instructions that, when executed by the processing circuitry, configure the system to:
      determine a target dataset from among a plurality of preexisting datasets based on a request including a query for execution and a temporal granularity;
      query the target dataset based on the request; and
      generate an output based on a query result received in response to querying the target dataset, wherein each of the plurality of preexisting datasets is based on at least one temporal data requirement, wherein the plurality of datasets is generated based on a data model, the data model including a data structure and representing a set of data larger in size than at least one of the plurality of datasets, wherein at least one dataset of the plurality of datasets has a size that is different from respective sizes of other datasets.

9. The system of claim 8, wherein the target dataset is a first target dataset and wherein the memory contains further instructions that, when executed by the processing circuitry further configure the system to:
   determine a plurality of target datasets including the first target dataset, wherein each target dataset is determined based on the request and a respective temporal data requirement.

10. The system of claim 9, wherein the memory contains further instructions that, when executed by the processing circuitry further configure the system to:
    generate the output based on a plurality of query results, each query result corresponding to a target dataset of the plurality of target datasets.

11. The system of claim 9, wherein the memory contains further instructions that, when executed by the processing circuitry further configure the system to:
    generate an aggregated dataset based on a subset of the plurality of target datasets; and
    query the aggregated dataset based on the request.

12. The system of claim 11, wherein the memory contains further instructions that, when executed by the processing circuitry further configure the system to:
    further generate the aggregate dataset based on a weight assigned to each target dataset of the subset of the plurality of target datasets.

13. The system of claim 12, wherein each weight is based on a temporal requirement of an associated target dataset.

* * * * *